United States Patent [19]

Akatsuka

[11] Patent Number: 5,626,120

[45] Date of Patent: May 6, 1997

[54] ENGINE CONTROL SYSTEM AND METHOD

[75] Inventor: Hidenori Akatsuka, Iwata, Japan

[73] Assignee: Yamaha Hatsudoki Kabushiki Kaisha, Iwata, Japan

[21] Appl. No.: 658,375

[22] Filed: Jun. 5, 1996

[30] Foreign Application Priority Data

Jun. 5, 1995 [JP] Japan ................................. 7-137590

[51] Int. Cl.$^6$ ........................................... F02M 51/00
[52] U.S. Cl. ............................................... 123/479
[58] Field of Search ............................. 123/479, 487, 123/480, 490, 674; 364/431.05, 431.12, 431.11

[56] References Cited

U.S. PATENT DOCUMENTS

| | | | |
|---|---|---|---|
| 5,233,964 | 8/1993 | Jamoua et al. | 123/479 |
| 5,318,003 | 6/1994 | Kadota | 123/674 |
| 5,505,179 | 4/1996 | Brennan | 123/479 |
| 5,526,267 | 6/1996 | Sogawa | 364/431.11 |
| 5,548,514 | 8/1996 | Hasegawa et al. | 364/431.05 |

*Primary Examiner*—Raymond A. Nelli
*Attorney, Agent, or Firm*—Knobbe, Martens, Olson & Bear LLP

[57] ABSTRACT

A control system and method for an internal combustion engine that employs a throttle position sensor and an engine speed sensor. The initial fuel air ratio control is based upon a map experimentally determined from throttle position and engine speed settings for optimum performance. However, in the event the throttle position sensor is deemed to be inaccurate, then another method is utilized for engine control purposes. In most embodiments, a map is also used in the other way.

20 Claims, 14 Drawing Sheets

Injection Amount Map At Throttle Sensor Fail

Basic Injection Amount Map

ENGINE CONTROL SYSTEM AND METHOD

BACKGROUND OF THE INVENTION

This invention relates to an improved engine control system and method and more particularly to a simplified control system and method for engines.

Feedback control systems have been proposed for use in engine management systems to improve engine performance, fuel economy and exhaust emission control. One form of feedback control system employs an air/fuel ratio sensor such as an oxygen ($O_2$) sensor. The oxygen sensor is positioned to receive the exhaust gases from the combustion chamber. From determining the amount of oxygen in the exhaust gases the actual air/fuel ratio burnt in the cylinder can be determined.

Although oxygen sensor feedback control systems can offer the prospect of very efficient and effective engine control, they are quite costly. In addition, there are some engine conditions wherein the feedback control from a sensor such as an oxygen sensor are not possible. For example, under initial startup and until the oxygen sensor reaches its operating temperature, it cannot be utilized as a control system. Furthermore, there is a wide variety of other engine running conditions wherein the output of the $O_2$ sensor for a variety of reasons cannot be employed for control. Even with feed back control systems the initial setting of the fuel air ratio is based on certain engine measurements and the feed back system makes adjustments in the basic settings based on the output of the $O_2$ sensor.

Thus, for these control conditions in engines that operate basically on a feedback control system and for other engines having simpler control systems, it is desirable to provide a very effective control system and method for the engine. Various arrangements have been provided for controlling the engine to maintain the desired fuel air ratio and exhaust emission control when feedback control is not employed. Generally these systems measure engine or ambient conditions and operate from one or more maps so as to provide the desired control for the various conditions sensed. Obviously, the more conditions sensed the greater the memory and map capacity of the control unit must be. On the other hand, the simpler the system is, the more likely it is to be not fully responsive to the actual running conditions of the engine.

It is, therefore, a principal object of this invention to provide an improved control system for an engine wherein the control system is simple and also provides effective control.

It is a still further object of this invention to provide an improved and simplified control system and method for an engine that can be utilized for engines without feedback control or for engines that have feedback control, but at such times when feedback control is not feasible or desirable.

As has been previously noted, the number of conditions sensed will determine the cost of the system. The more conditions sensed, the greater number of sensors required and also the more complicated the control strategy is. Therefore, it has been proposed to provide an engine control system wherein the engine control is based primarily on engine speed and engine load. Engine speed measuring devices are relatively simple, but engine load measuring devices take a wide variety of forms. For example, the simplest form of load sensor is nothing more than a throttle position sensor. The operator throttle position is a very good indication of the operator demand and also the load on the engine. However, engine throttle position sensors are not always accurate under all conditions.

Another form of sensor which may be utilized as an indication of engine load is an air flow sensor. These sensors take a wide variety of shapes and series of operation, but for the most part they are expensive. Therefore, in a simplified system, it is desirable and maybe optimal to employ a throttle position sensor and an engine speed sensor.

As has been noted, however, the utilization of a throttle position sensor is not always reliable since these sensors may be subject to malfunction. That is, the devices are primarily mechanical and require mechanical adjustment and/or setting. These adjustments can be easily upset. On the other hand, if the use of the throttle position sensor is totally eliminated, then in most engine running conditions the engine control is not as accurate as could be desired.

It is, therefore, a principal object of this invention to provide an improved engine control system and method that operates under most circumstances on engine load and speed control utilizing a throttle position sensor, but wherein another alternative control routine is possible in the event of malfunctions in the throttle position sensor.

It is a primary object of the invention to provide an improved and simplified engine control system and method.

SUMMARY OF THE INVENTION

This invention is adapted to be embodied in an engine control system and method for an internal combustion engine having a combustion chamber, an induction and charge forming system for supplying an air fuel charge to the engine, and an exhaust system for discharging any burnt charge from the engine. The air fuel ratio for the engine is controlled by an air fuel control system that includes an engine speed sensor for sensing the speed of the engine and an engine throttle position sensor which senses the condition of the operator demand for engine output.

In accordance with an apparatus for practicing the invention, the outputs from the engine speed and operator demand signals indicated by the respective sensors is measured and, if the operator control position sensor is deemed to be accurate, the control of the air fuel ratio is based upon a map indicative of air fuel ratio in relation to engine operator control position and engine speed. However, if it is determined that the engine operator control sensor is inaccurate, then the control is based upon another map that indicates desired air fuel ratio only from engine speed condition.

In accordance with a method for practicing the invention, if the output of the operator control sensor is deemed to be accurate, then the fuel air ratio is set based upon a map of engine speed and operator load conditions. If, however, the engine operator control sensor is deemed to be inaccurate, then the control is based upon a map determined only by engine speed.

DETAILED DESCRIPTION OF THE PREFERRED EMBODIMENTS OF THE INVENTION

Figure 1:
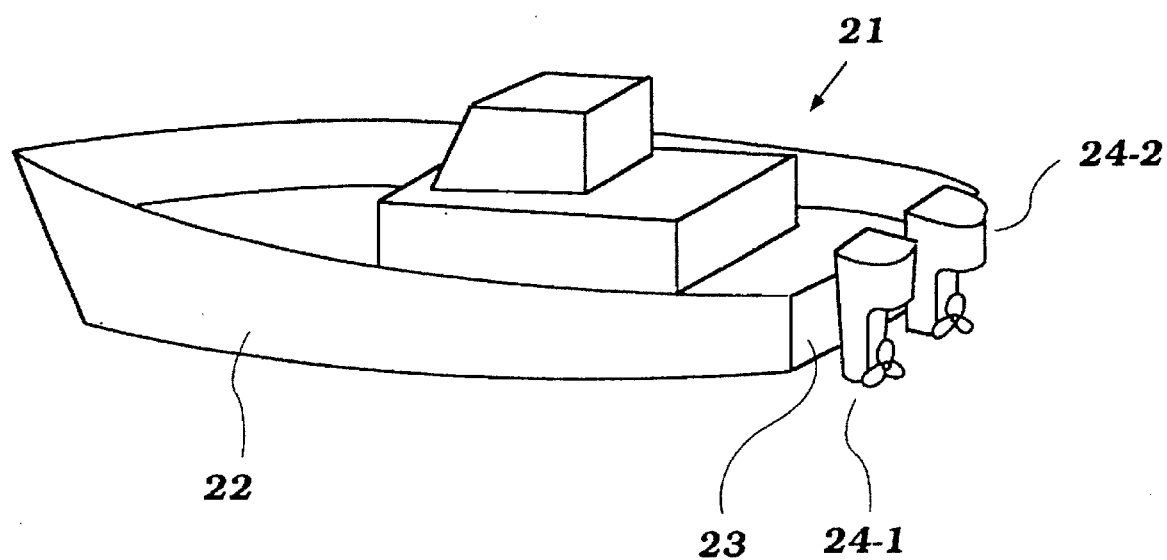
FIG. 1 is a rear, side perspective view of a watercraft powered by a propulsion system constructed and operated in accordance with an embodiment of the invention.

Referring now in detail to the drawings and initially to FIG. 1, a watercraft constructed and propelled by a propulsion system that is operated and constructed in accordance with an embodiment of the invention is identified generally by the reference numeral 21. Although the invention is described in conjunction with a watercraft such as the watercraft 21, it will be readily apparent to those skilled in the art from the following description, as well as from the foregoing remarks, that the invention is directed primarily to the control for the propulsion system of the watercraft 21.

For this reason and since the control system is not limited to any particular engine or engine type or use for the engine, an application to a watercraft, such as the watercraft 21, is utilized only to enable to those skilled in the art to understand how the invention can be utilized. Those skilled in the art will readily understand how the invention can be utilized in conjunction with any of a wide variety of types of internal combustion engines as well as loads operated by those engines.

To continue, the watercraft 21 includes a hull 22 which has a transom 23 upon which a pair of outboard motor propulsion devices 24-1 and 24-2 are mounted. The invention is described in conjunction with an application embodying dual propulsion devices because, as will become apparent, certain facets of the invention have utility in conjunction with arrangements wherein there are such dual propulsion devices. For the foregoing reasons, however, those skilled in the art will readily understand how the invention can be employed with engine applications utilizing only one engine.

Figure 2:
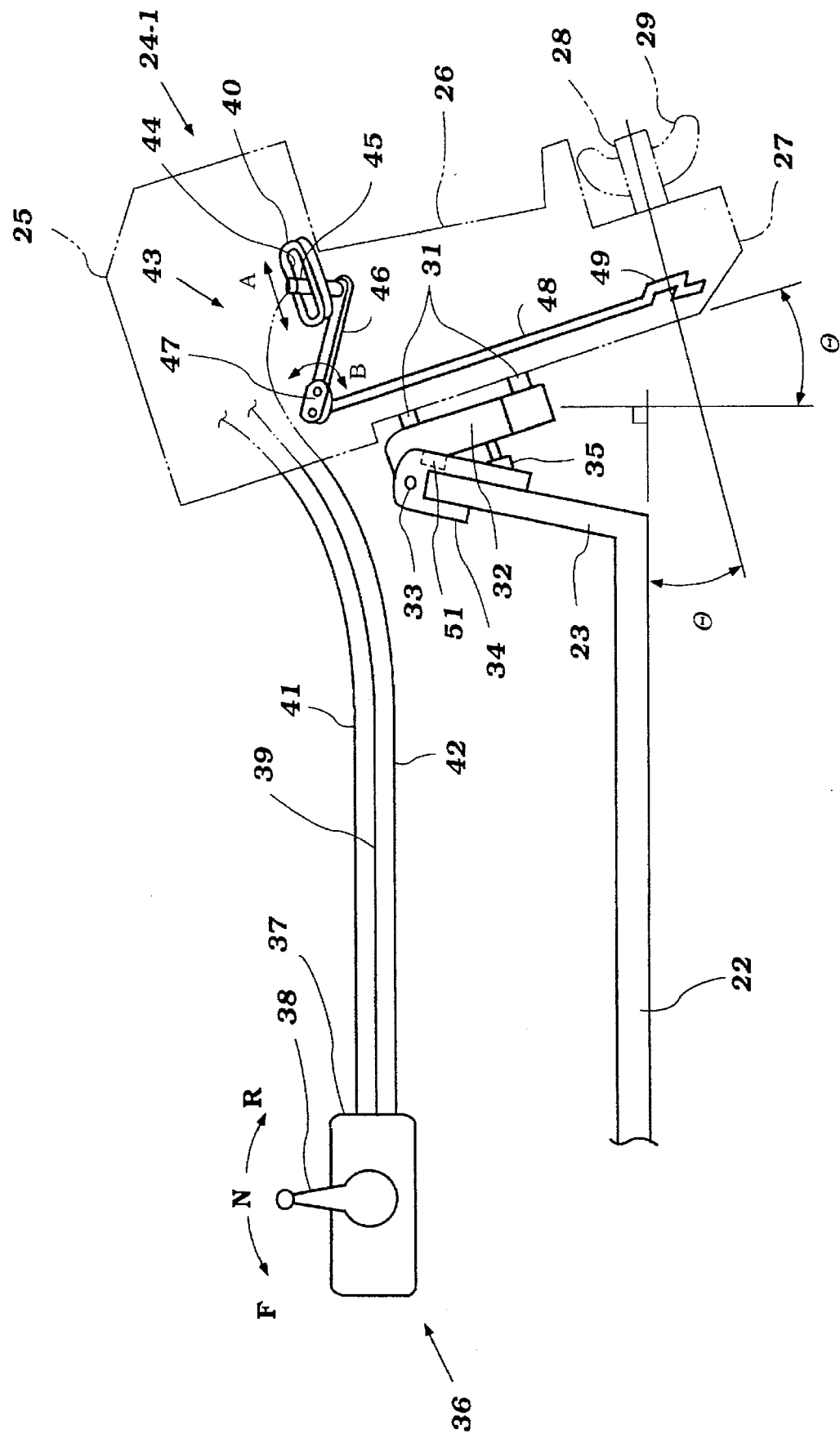
FIG. 2 is a side elevational view of a portion of the watercraft and specifically of one of the propulsion devices and its operator controls.

As has been noted, the propulsion devices 24-1 and 24-2 are outboard motors and these motors are shown in more detail in FIG. 2 wherein their attachment to the transom 23 of the watercraft 22 is also shown in more detail. Each outboard motor includes a powerhead, shown in phantom and indicated by the reference numeral 25. This powerhead contains a powering internal combustion engine which, as previously noted, may be of any known type or configuration. In the exemplary embodiment that will be described, this engine is of the V-6 two-cycle crankcase compression type. For the reasons already noted, the invention can be utilized with a wide variety of types of engines other than that specifically described.

As is typical with outboard motor practice, the engine in the powerhead 25 is mounted so that its output shaft or crankshaft rotates about a vertically extending axis. This facilitates connection to a drive shaft (not shown) that depends into and is rotatably journaled in a drive shaft housing 26.

This drive shaft continues on to a lower unit 27 in which a forward neutral reverse transmission of a known, bevel gear type, is positioned. This transmission drives a propeller shaft 28 to which a propeller 29 is affixed in a known manner. In applications employing dual outboard motors as described, each propeller 29 preferably rotates in a direction opposite to the other during both the forward and reverse drive modes.

Each outboard motor has a steering shaft affixed, as by brackets 31, to its drive shaft housing 26 in a known manner. These steering shafts are journaled for rotational movement about a vertically extending steering axis in a respective swivel bracket 32. The swivel bracket 32 is, in turn, pivotally connected by means of a pivot pin 33 to a clamping bracket 34. The pivotal connection provided by the pivot pin 33 permits tilt and trim movement of the outboard motors 24 as is well known in this art.

A hydraulic motor and shock absorbing assembly, indicated generally by the reference numeral 35, is interposed between the transom 23 of the watercraft and the outboard motors 24 for accomplishing controlled tilt and trim movement. These hydraulic motors 35 also may include shock absorbing mechanisms which permit the outboard motors 24 to pop when underwater obstacles are struck.

The clamping brackets 34 incorporate clamping mechanisms for attaching them to the transom 23 of the hull 22 in a well known manner.

As has been noted, the outboard motors 24 include a transmission which permits shifting between a forward, neutral and reverse position. In addition, the engine of the powerhead 25 is provided with some form of engine speed control which may constitute one or more throttle valves (not shown) of the engine. As is typical with marine practice, a single lever control, indicated generally by the reference numeral 36 may be mounted in the hull 22 at a position convenient to the operator and spaced from the transom 23. The single lever control 36 includes a base assembly 37 and an operator-controlled lever 38.

The lever 38 is connected by a first set of bowden wire actuators 39 and 41 to the engine speed control. In addition, a connection is provided by a bowden wire actuator 42 to a transmission shift control, shown in part in perspective view in this figure and indicated generally by the reference numeral 43.

As those skilled in this art will readily understand, the single lever control 38 is movable between a neutral position indicated at N to a forward drive position F or a reverse drive position R. Generally, the way the system operates is that the single control lever 38 is movable through a first range from its neutral position to either the forward or reverse drive positions wherein the transmission, operated through the linkage system which will be described, moves from its neutral to its forward drive positions. After engagement of the clutches of the transmission has occurred, continued movement of the lever 38 will cause the throttle or engine speed controls to continue to open to permit increase in the engine's speed. It should be obvious that this type of mechanism is, however, subject to some defects due to misalignment, etc. which are significant in the control routine.

Although the throttle control is not shown because it is conventional, a portion of the transmission control is shown although that also is conventional. This transmission control includes a control lever 40 which is pivotally supported within the powerhead 25 and which defines a cam groove 44 in which a follower pin 45 is received. The follower pin 45 is mounted at one end of a shift control lever 46 which is connected by a coupling 47 to a shift control rod 48. The shift control rod 48 has a crank arm 49 at its lower end that cooperates with a suitable mechanism for effecting the operation of the transmission in the lower unit 27. Again, this mechanism is generally of the type known in the art and, since this mechanism forms no significant part of the invention, a further description of it is not believed to be necessary to permit those skilled in the art to practice the invention.

Although it has been noted that the specific construction of the engine and its controls may be of any type known in the art, reference may be had to the co-pending application of Kyoji Mukumoto, entitled Engine Control System and Method, Ser. No. 08/625,175 filed Mar. 29, 1996 and assigned to the assignee hereof for the details of a specific type of engine with which the invention may be practiced. It is not believed that the disclosure of that co-pending application is necessary to permit those skilled in the art to practice the invention.

However, the invention is adapted for utilization with engines having one or more combustion chambers which may be formed, for example, by cylinder blocks, attached or integral cylinder heads and pistons which reciprocate in cylinder bores formed in the cylinder block. These pistons are connected by means of connecting rods to a crankshaft which, as has been aforenoted, preferably rotates in outboard motor practice about a vertically extending axis.

An induction system which may include a throttle valve controlled by the bowden wire actuators 39 and 41 is provided for controlling the air flow to the engine. This induction system also includes a charge forming system which may, in accordance with a preferred form of the invention, include one or more fuel injectors. The amount of fuel injected by these fuel injectors is controlled by controlling the duration of fuel injection. The timing of beginning and ending of the fuel injection is also controlled in accordance with a desired engine basic control strategy.

The charge of fuel and air which is delivered to the combustion chambers is then fired upon ignition. Ignition may occur either under the control of spark plugs, if a spark-ignited (SI) engine is utilized or by the timing of fuel injection if a diesel engine is utilized. The charge burns and expands, and is then discharged through a suitable exhaust system.

In outboard motor practice, this exhaust system may include a high speed exhaust gas discharge which discharges through the hub of the propeller 29 under most engine operating conditions. Since the back pressure on the engine can affect the engine performance, the outboard motor 24 is provided with a trim angle sensor, indicated schematically by the reference numeral 51 which measures the angles θ between the steering shaft and a vertical as shown in FIG. 2. This angular measurement by the trim angle sensor 51 is utilized in engine control, as will be described.

In connection with the basic engine control, there are certain types of sensors which may be incorporated and, although the engine is not shown in detail, those skilled in the art will readily understand the type of sensors which are described and those which are available in the art and which may be utilized to practice the invention. In addition to those sensors described, additional sensors may be employed. Also, in conjunction with certain control strategies, the number of sensors may be substantially reduced. In fact, an important feature of the invention deals with a simplified control of the engine wherein only two or, under abnormal conditions, one sensor is employed for providing total engine control.

This basic engine control will now be described by primary reference to FIGS. 3 and 4 wherein the various sensors are shown in a schematic fashion. Even though the showing and description is schematic, those skilled in the art will readily understand how to practice the invention in conjunction with actual physical embodiments.

The control includes an ECU 52 controls a capacitor discharge ignition circuit and the firing of spark plugs 53. The spark plugs 53 and other components of the system which are associated with a particular cylinder of the engine have their reference characters noted with a suffix showing the specific cylinder number.

In addition, the ECU controls the engine fuel injectors 54 so as to control both the beginning and duration of fuel injection and the regulated fuel pressure, as already noted. The ECU 52 operates on a strategy for the spark control and fuel injection control as will be described. This system employs an exhaust sensor assembly indicated generally by the reference numeral 55. This sensor is preferably an oxygen ($O_2$) sensor constructed in accordance with the sensor described in detail in the aforenoted copending application.

So as to permit engine management, a number of sensors are employed. Some of these sensors are illustrated either schematically or in actual form, and others are not illustrated. It should be apparent to those skilled in the art, however, how the invention can be practiced with a wide variety of control strategies other than or in combination with those which form the invention.

Figure 3:
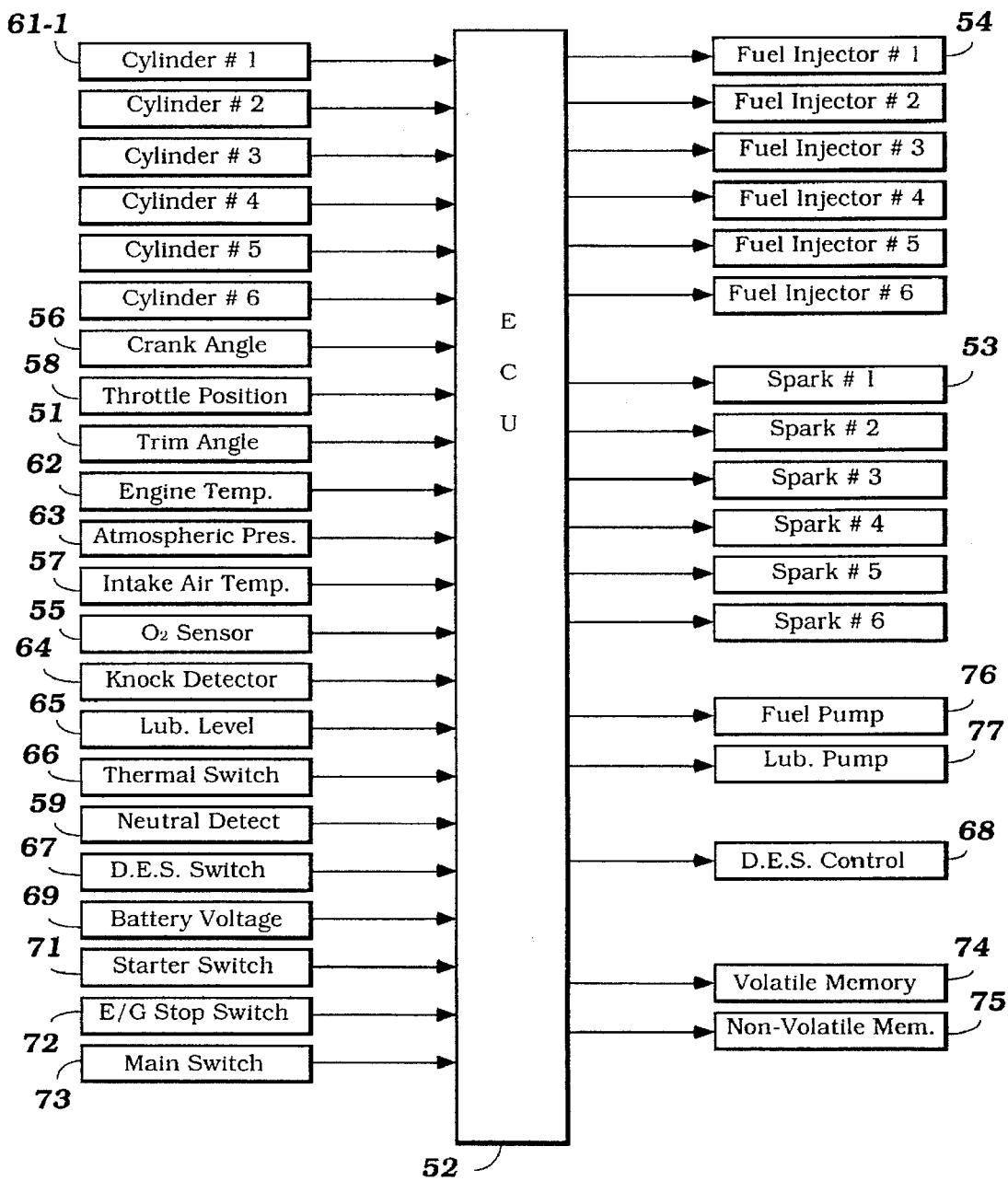
FIG. 3 is a diagrammatic view showing the relationship of the various detectors of the propulsion unit controls to the ECU and the relationship of the ECU to certain controlled portions of the engine, specifically the fuel injectors, ignition system, fuel pump, and oil pump.
Figure 4:
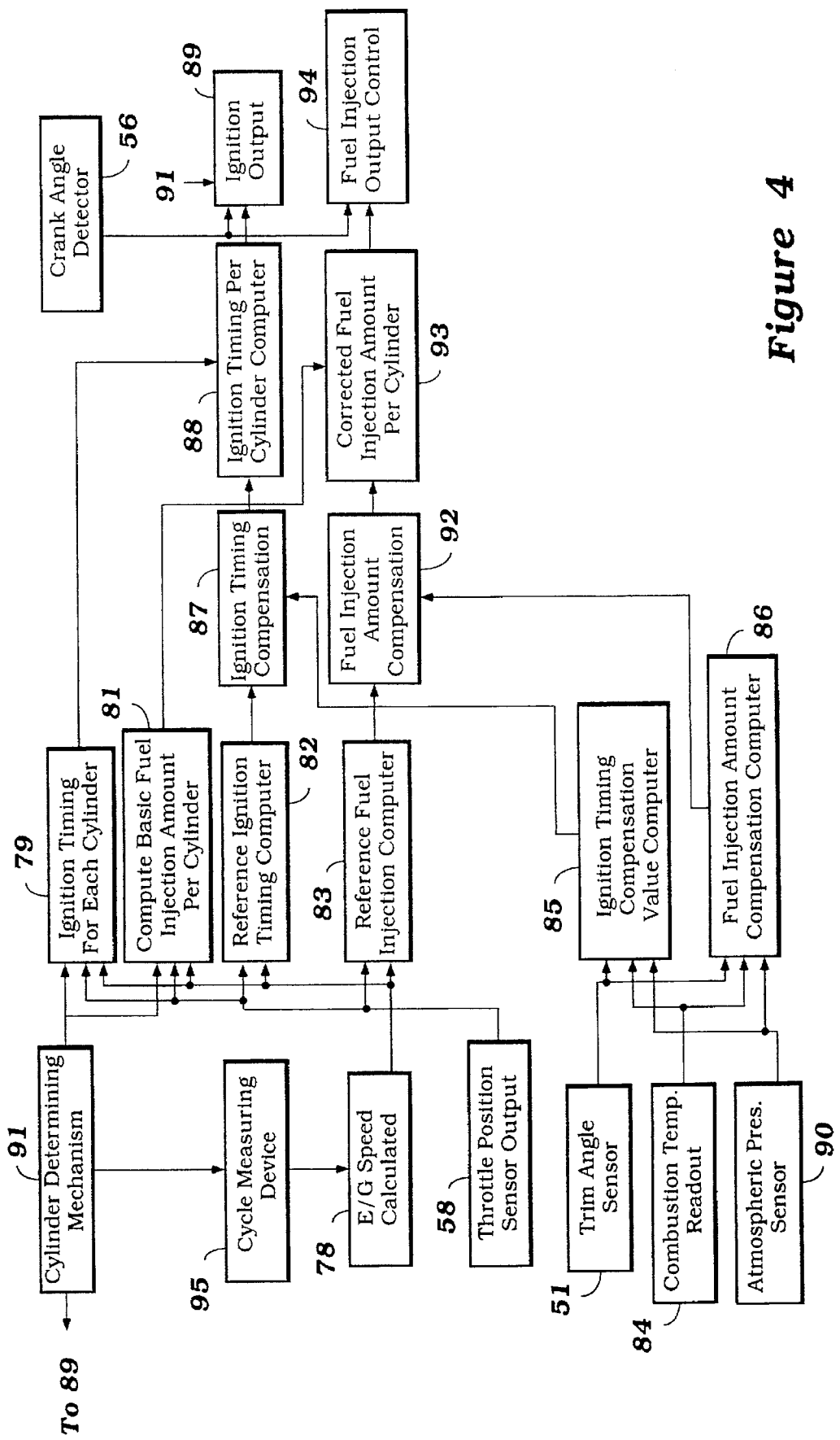
FIG. 4 is a further block diagram showing how the various detectors are interrelated to the various computing portions of the ECU and the outputs to the ignition and fuel controls.

The sensors which appear in FIGS. 3 and 4 include a crankshaft position sensor 56 which senses the angular position of the engine crankshaft and also the speed of its rotation. A crankcase pressure sensor may also provided for sensing the pressure in the individual crankcase chambers. Among other things, this crankcase pressure signal may be employed as a means for measuring intake air flow and, accordingly, controlling the amount of fuel injected by the injectors 54, as well as their timing.

A temperature sensor 57 may be provided in the intake passage downstream of the engine throttle valves for sensing the temperature of the intake air. In addition, the position of the throttle valves is sensed by a throttle position sensor 58.

In accordance with some portions of the control strategy, it may also be desirable to be able to sense the condition of the described transmission for driving the propeller 29 or at least when it is shifted into or out of neutral. Thus, a transmission condition sensor 59 is mounted in the power head and cooperates with the shift control mechanism for providing the appropriate indication.

As noted, the trim angle sensor 51 is provided for sensing the angular position of the swivel bracket 32 relative to the clamping bracket 34.

Continuing to refer to FIG. 3, this shows the ECU 52 and its input and output signals which includes the output signals to the fuel injectors 54 and the spark plugs 53 for controlling the time of beginning of injection of each of the fuel injectors 54, the duration of injection thereof and also the timing of firing of the spark plugs 53. Certain of the detectors for the engine control have already been described and these include the oxygen sensor 55, the crank angle sensor 56, the intake air temperature sensor 57, the throttle position detector 58, the transmission neutral detector switch 59 and the trim angle sensor 51. In addition, each cylinder is provided with a respective detector 61 which is associated with the crankshaft and indicates when the respective cylinder is in a specific crank angle. This may be such a position as bottom dead center (BDC) or top dead center (TDC). These sensors cooperate along with the basic crank angle position sensor 56 and provide indications when the respective cylinders are in certain positions as noted.

There is also provided an engine temperature sensor 62 which is mounted in an appropriate body of the engine and which senses its temperature. As will become apparent, the output of the engine temperature sensor 62 may be utilized also to detect when the engine is in an over-heat mode and initiate protective action so as to permit the engine to continue to operate, but restrict its speed if an over-temperature condition exists. This speed limitation may be accomplished by disabling the operation of one or more of the engine cylinders. As will also become apparent, the actual cylinder which is disabled may be changed during this protective running mode so that all cylinders will fire at least some times, but certain cylinders will be skipped during one or more cycles. This will ensure against plug fowling, etc. during this protective mode.

There is also provided an atmospheric air pressure detector 63 that provides a signal indicative of atmospheric air pressure for engine control.

The engine may also be provided with a knock detector 64, which appears schematically in FIG. 2 and which outputs a signal when an knocking condition is encountered. Any appropriate control may be utilized for minimizing knocking, such as changing spark timing and/or fuel injection amount and timing as will also be discussed later.

The engine may be provided with a separate lubricating system that includes a lubricate tank. Thus there may be provided a lubricant level detector 65 that also provides a signal indicative of when the lubricant lever is below a predetermined value. Like overheat conditions, this low lubricant level may be employed as a warning and the engine speed can be limited when the lubricant level, as sensed by the sensor 65, falls below a predetermined level. Any well known system for accomplishing this can be provided.

In addition to the engine temperature sensor 62, there may be also provided a thermal switch 66 that can be set to signal when an over-temperature condition exists as opposed to utilizing the output of the engine temperature sensor 62.

In applications where there are two outboard motors 24 mounted on the transom 23 of the same watercraft, as illustrated, if an abnormal conditions exists in one of these outboard motors and its speed is limited in the aforenoted manner, it is also desirable to ensure that the other outboard motor also has its speed limited. This improves directional control. There have been disclosed in the prior art various arrangements for providing this interrelated control and such a control is indicated schematically as 67 and is referred to as a DES (Dual Engine System) detector. This is a crossover circuit, indicated schematically at 68, which provides the signal for engine speed control to be transmitted to the normally operating engine as well as to the abnormally operating engine for the aforenoted reasons.

In addition to the actual engine and transmission condition detectors there may also be provided detectors that detect the condition of certain controls and auxiliaries such as a battery voltage detector 69, a starter switch detector 71 and an engine stop or kill switch detector 72. If battery voltage is below a predetermined value, certain corrective factors may be taken. Also, when the engine starter switch is actuated as indicated by the starter switch detector 71, the program can be reset so as to indicate that a new engine cycle of operation will be occurring. The engine stop switch detector 72 is utilized so as to provide a shutdown control for stopping of the engine which also may be of any known type. There is also provided a main switch 73.

In addition to those inputs noted, various other ambient engine or related inputs may be supplied to the ECU 52 for the engine management system.

The ECU 52 also is provided with a memory that is comprised of a volatile memory 74 and a nonvolatile memory 75. The volatile memory 74 may be employed for providing certain learning functions for the control routine. The nonvolatile memory 75 may contain maps for control during certain phases of non-feedback control, in accordance with the invention. The ECU 52 also controls, in addition to the fuel injectors 54 and the firing of the spark plugs 53, a high pressure fuel pump 76 and the lubricating pump which has been referred to but which has not been illustrated. This lubricating pump is shown schematically at 77 in FIG. 3. Obviously, those skilled in the art will understand how these various controls cooperate with the components of the engine to provide their control, as will become apparent.

Referring now to FIG. 4, this figure illustrates certain of the sensor outputs previously referred to and particularly in connection with FIG. 3 and the various sections of the ECU 52 and how they interrelate with each other so as to provide the basic fuel injection and ignition controls. This figure is obviously schematic and does not show all of the interconnections between the various sensors and control sections of the ECU 52. However, this figure is useful in permitting those skilled in the art to understand how the systems are interrelated before the actual control sequence will be described. FIG. 4 also shows primarily the method and apparatus by which the determination of the basic fuel injection timing and amount and ignition timing are determined.

Referring now specifically to this figure, the system includes a first section wherein the basic ignition timing, fuel injection timing and duration are computed. These basic timings and amounts are made from measuring certain engine parameters such as engine speed and load. In this embodiment, engine speed, calculated at the section 78, is determined by counting the number of pulses from the crank angle sensor 56 in a unit of time. In addition to providing the signal indicative of crank angle, by summing the number of pulses from the sensor 56 in a given time interval it will be possible to determine the actual engine rotational speed.

In addition to measuring the engine speed in order to obtain the basic control parameters, the engine load is also measured. This is done by utilizing the output of the throttle position sensor 58 although various other factors which determine the load on the engine can be utilized.

The outputs from the engine speed determination and throttle opening or load are sent to a number of calculating sections in the ECU 52. These include a section 79 that computes the ignition timing for each cylinder. This information is derived from an appropriate map such as may be reserved in the aforenoted nonvolatile memory 75 and is based upon the time before or after top dead center for each cylinder. By taking this timing and comparing it with the actual crankshaft rotation, the appropriate timing for all cylinders can be calculated.

In addition, the basic maps aforereferred to also contain an amount of fuel required for each cylinder for the sensed engine running conditions. This is in essence a basic fuel injection amount computation made in the section 81. This computation may be based either on fuel volume or duration of injection timing. Air flow volume and other factors may be employed to set the basic fuel injection amount.

The outputs from the engine speed calculation 78 and engine load or throttle position sensor 58 are also transmitted to a reference ignition timing computer 82 and a reference fuel injection computer 83. In addition to the outputs of the basic engine condition sensors (speed and load in the described embodiment) there are also other external factors which will determine the optimum basic fuel injection timing duration and ignition timing. These may include among the other things, the trim angle of the outboard motor as determined by the trim angle sensor 51 and the actual combustion temperature as indicated by a sensor indicated schematically at 84. Furthermore, the atmospheric or barometric pressure, all previously referred to also is significant and this is read by an appropriate sensor 90.

The outputs from these sensors 51 and 84 are transmitted to an ignition timing compensation computer section 85 and a fuel injection amount compensating computer 86. These compensation factors are determined also based upon known value maps programmed into the ECU 52.

The outputs from the reference ignition timing computer 82 and the compensation value computer 85 are transmitted to an ignition timing compensating circuit 87. This then outputs a signal to the ignition timing per cylinder compensating circuit 88 which receives also signals from the unit 79 that sets the ignition timing for each cylinder. This then determines the appropriate timing for the ignition output from the driver circuit 89 for firing the individual spark plugs 53.

The crank angle detector 56 also is utilized to determine the appropriate ignition timing as is the output from a cylinder determination means, indicated generally by the reference numeral 91 and which determines, in a way which will be described, which individual cylinder is to be fired, depending upon the angular position of the crankshaft. A similar system is employed for the fuel injection volume control. That is, a section 92 receives the reference fuel injection amount signal from the section 83 and the compensation amount from the section 86 and processes a corrected fuel injection amount. This is then transmitted to the section 93 which also receives the basic fuel injection amount per cylinder calculation from the section 81 to determine the corrected fuel injection amount per cylinder. This amount is then output to a fuel injector control circuit 94 which again receives the signals from the crank angle detector and cylinder determinator to supply the appropriate amounts of fuel to each cylinder by controlling the duration of opening of the fuel injector. Timing for the beginning of injection may also be controlled in a like manner.

The system also includes a cycle measuring arrangement 95 which determines the actual cycle of operation as will also be described later.

Figure 5:
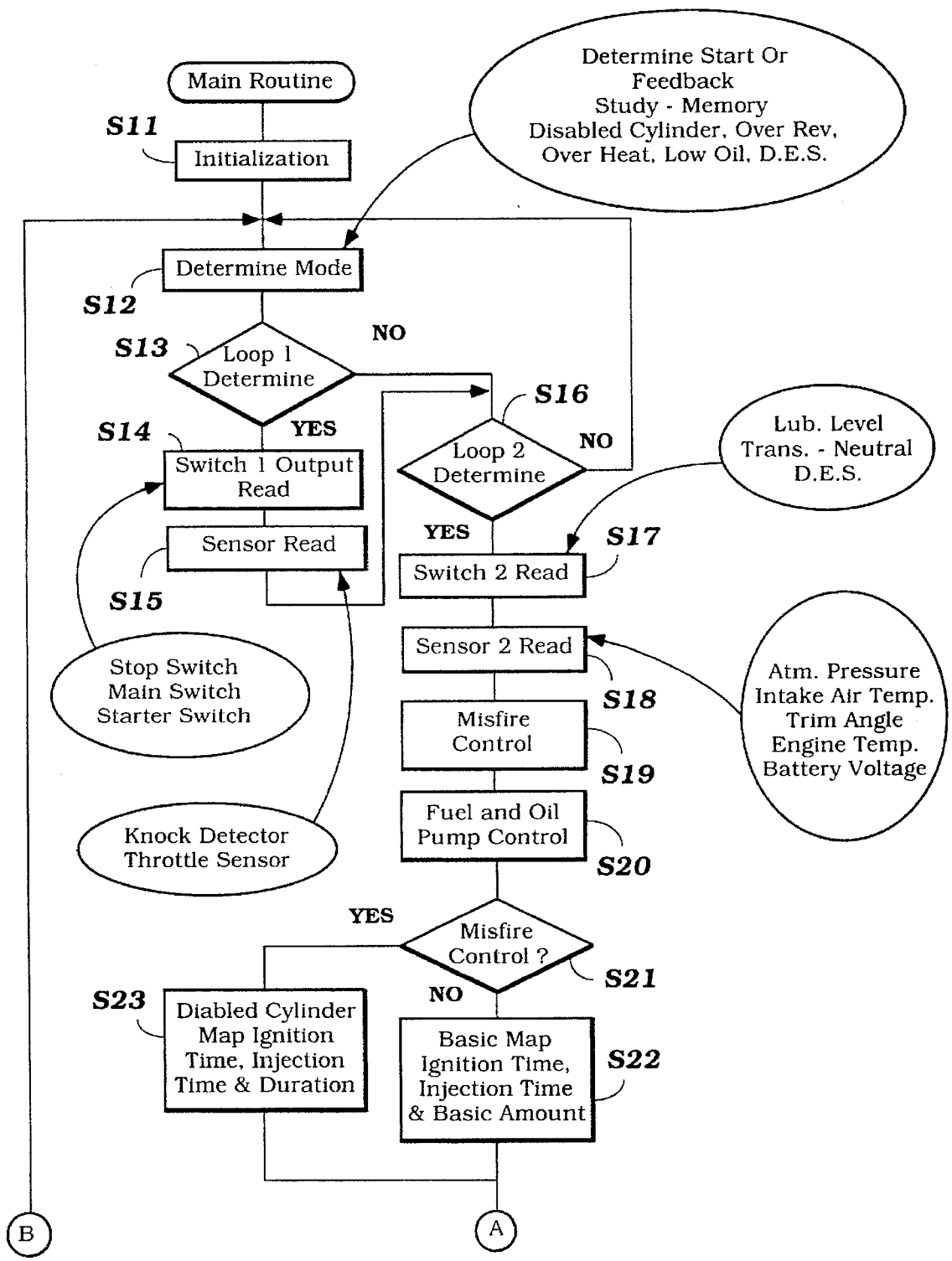
FIG. 5 is a partial block diagram showing the initial portion of the main control routine wherein the system provides the control depending upon whether or not a cylinder is disabled to slow the engine speed because of an encountered abnormality that could cause engine damage if not controlled.

The basic control routine by which the actual fuel injection timing amount and ignition timing are determined will now be described beginning by reference to FIG. 5 and carrying on to those figures which follow it. As will become apparent, the basic concept operates primarily to set a basic fuel injection amount and timing determined by engine speed and load as aforenoted. Once the system is operating and the oxygen sensor 55 is at its operating temperature, the system shifts to a feedback control system. This feedback control system is superimposed upon the basic fuel injection amount and timing and spark timing so as to more quickly bring the engine to the desired running condition.

The output or combustion condition in one combustion chamber only is sensed and that signal is employed for controlling the other cylinders. In addition, there are some times when cylinders are disabled to reduce the speed of the engine for protection, as has also been noted. This system ensures proper control also during these times even if the disabled cylinder is the one with which the sensor is associated.

The control routine will now be described initially by reference to FIG. 5 with the discussion continuing onto the remaining figures where necessary. The program starts and goes to the step S11 where the system is initialized. The program then moves to the step S12 wherein the ECU 52 determines the operational mode. This operational mode may be of one of many types and is based upon primarily the results of the inputs from the sensors as shown in FIG. 3.

The available modes may include start-up mode when the engine is first started. As previously noted, there is a starter switch 71 and, when the starter switch has been initiated and the program has just begun, the ECU 52 will assume the starting mode and go into the appropriate control routine for that starting mode. This will employ neither feedback control nor necessarily sensing of engine running conditions, but rather set the appropriate parameters for engine starting and/or warm-up.

Another potential mode is the oxygen sensor feedback mode under which feedback control will be accomplished in the manner which will be described.

A further mode is the study or memory mode and this is the mode, as will also be described wherein the ECU and specifically the volatile memory 74 thereof receives data from engine running conditions and memorizes them for use under certain operating conditions, as will be described.

Another potential mode is the operation when a cylinder or more is being disabled to affect speed control and protection for a so-called "limp home" mode. This mode will also be described later by reference to the remaining figures and is based upon the sensing of other conditions which will now be also mentioned.

The disabling of cylinders to protect the engine may occur in response to the sensing of a number of critical features. One of these features is if the engine is operating at too high a speed or an over-rev condition. Another condition is if the engine temperature is too high or is approaching a high level where there may be a problem. Another feature, as has been noted, is if there is a low oil level in the oil reservoir. A still further condition is if there is a dual engine system and one of the engines experiences one of the aforenoted conditions and, thus, both engines will be slow even though one engine may not require this.

Having determined the operational mode at the step S12, the program moves to the step S13 to determine which of the two time programs or control loops are presently occurring. The system is provided with two separate control loops: loop 1, which repeats more frequently than the other loop (loop 2). The timing for loop 1 may be 4 milliseconds and the timing for loop 2 may be 8 milliseconds. These alternative control loops are utilized so as to minimize the memory requirements and loading on the ECU 52.

Figure 7:
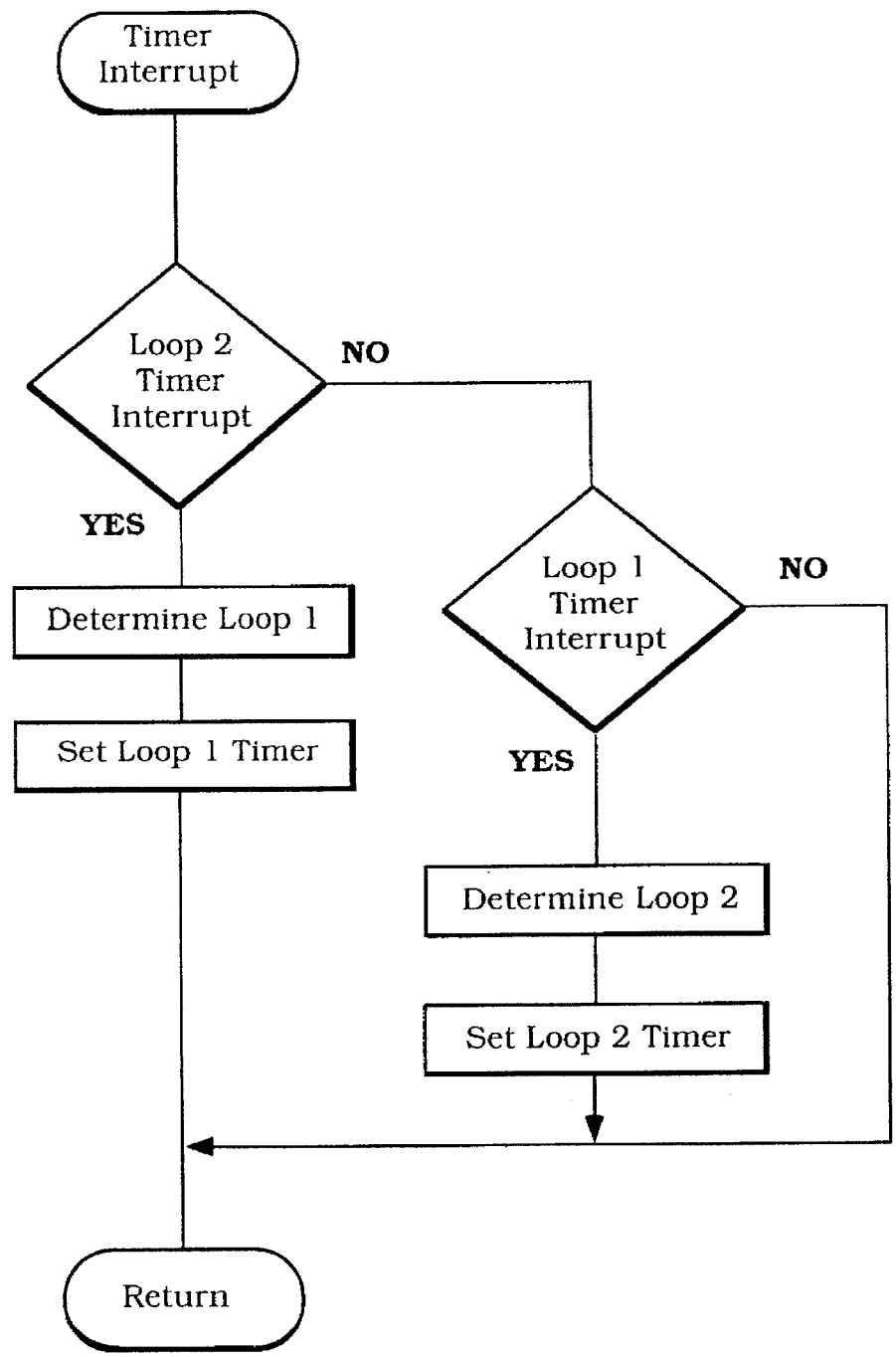
FIG. 7 is a block diagram showing the control routine of the timer interrupt sequence of operation.

FIG. 7 shows how the system determines which control loop the program is operating on. As may be seen in this figure, it begins when the timer is interrupted and then moves to the first step to determine if loop 2 timer has been interrupted. If it has not, the program moves to a step to determine if the loop 1 timer has been interrupted. If it has not, the program then returns. If, however, it is determined that the loop 1 timer has been interrupted, then the program moves to the next step to determine that the system is operating on loop 2 and then moves to set the timer for loop 2.

If however, at the first step it is determined that the loop 2 timer has been interrupted, then the program moves to the next step to determine that loop 1 is being run and the program move to the next step to set loop 1 timer. Regardless of which timer is set, the program then returns.

Assuming that the loop 1 mode has been determined at the step S13, the program moves to the step S14, first to read the output of certain switches. These switches may include the main engine stop or kill switch 72, the main switch for the entire circuit 73 or the starter switch 71. The purpose for reading these switches is to determine whether the engine is in the starting mode or in a stopping or stopped mode so as to provide information when returning to the step S12 to determine the proper control mode for the ECU 52 to execute.

Having read the switches at the step S14, the program moves to the step S15 so as to read certain engine switch conditions which may determine the necessary mode. These switches may include, for example, the output from the knock detector 64 and/or the output from the throttle position sensor 58.

If loop 1 is not being performed at the step S13 or if it and the steps S14 and S15 have been completed, the program moves to the step S16 to determine if the time has run so as to initiate the loop 2 control routine. If the time has not run, the program repeats back to the step S12.

If the system is operating in the loop 2 mode of determination, the program then moves to the step S17 to read the output from certain additional switches. These switches can constitute the lubricant level switch 65, the neutral detector switch 59 and the DES output switch 67 to determine if any of these specific control routines conditions are required. Having read the second series switches at S17, the program then moves to the step S18 to read the outputs from additional sensors to those read at the step S15. These sensors include the atmospheric air pressure sensor 63, the intake air temperature from the sensor 57, the trim angle from the trim angle sensor 51, the engine temperature from the engine temperature sensor 62 and the battery voltage from the battery sensor 69.

The program then moves to the step S19 to determine if cylinder firing disabling is required from the outputs of the sensors already taken at the steps S17 and/or S18. The program then moves to the step S20 so as to provide the necessary fuel pump and oil pump control.

The program then moves to the step S21 to determine if the system should be operating under normal control or misfire control. If no misfire control is required because none of the engine protection conditions are required, then the program moves to the step S22 to determine from the basic map the computation of the ignition timing, injection timing and amount of injection per cylinder. As has been previously noted, this may be determined from engine speed and engine load with engine load being determined by throttle valve position. This basic map is contained in the nonvolatile memory 75 of the ECU 52 as previously noted.

If at the step S21 it is determined that the program requires misfire or speed control by eliminating the firing of one cylinder, the program moves to the step S23 to determine from a further map referred to as a disabled cylinder map the ignition timing and injection timing and duration. This map is also programmed into the nonvolatile memory 75 of the ECU 52 from predetermined data and is based upon the fact that the engine will be running on a lesser than total number of cylinders.

Figure 6:
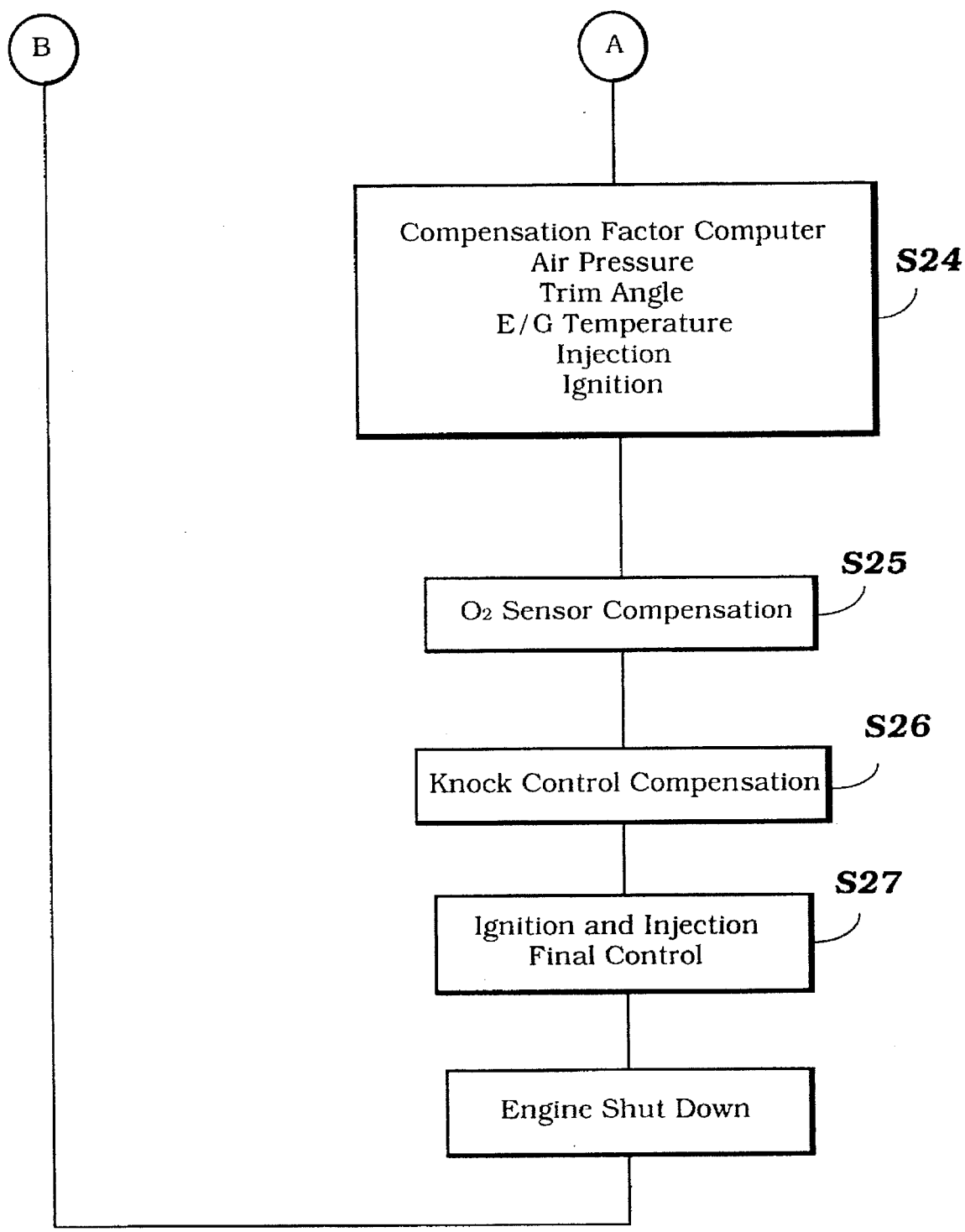
FIG. 6 is a partial block diagram of the remainder of the control routine shown in FIG. 5.

Once the basic ignition timing and injection timing and amount are determined at the appropriate steps S22 or S23, the program then moves to the step S24 (See now FIG. 6) so as to compute certain compensation factors for ignition and/or injection timing. These compensations are the same as those compensations which have been indicated as being made at the sections 87 and 88 and 92 and 93 of FIG. 4.

These compensation factors may include such outputs as the altitude pressure compensation, trim angle compensation and engine temperature compensation determined by the outputs from the sensors 63, 51, and 62, respectively. In addition, there may be compensation for invalid injection time and ignition delay made at the step S24.

The program then moves to the step S25 to determine if the engine is operating under oxygen feedback control and to make the necessary feedback control compensations based upon the output of the oxygen sensor 55. The ways in which this is done will be described later and this may include the learning curve which will also be described.

The program then moves to the step S26 to determine if the output from the knock sensor 64 requires knock control compensation which may include either adjustments of spark timing and/or fuel injection amount. The program then moves to the step S27 so as to determine the final ignition timing injection timing and amount.

Another phase of the control routine will now be described by reference to FIG. 8. This phase has to do with the timing information primarily and certain procedure associated with the cylinder disabling mode for engine speed reduction and protection. The program begins when the timing sensor 56 indicates that the crankshaft is at top dead center. The program then moves to the step S28 to determine which cylinder it is that is at top dead center. This is done by utilizing the outputs of the cylinder position detectors 61.

The program then moves to the step S29 to ascertain from the order of approach of the cylinders to top dead center whether the engine is rotating in a forward or a reverse direction. It should be noted that, particularly on start-up, there is a possibility that the engine may actually begin to run in a reverse direction. This is a characteristic which is peculiar to two-cycle engines because of their inherent cycle operation.

If at the step S29 it is determined that the engine is rotating in a reverse direction, the program moves to the step S33 so as to initiate engine stopping. This may be done by ceasing the ignition and/or discontinuing the supply of fuel.

If at the step S29, however, it has been determined that the engine is rotating in the proper, forward direction, the program moves to the step S30 to measure the cycle of operation of the engine and then to the step S31 so as to actually compute the engine speed from the number of pulses from the crank position sensor 56 in relation to time, as previously noted. The program moves to the step S32 to determine if the engine speed is more than a predetermined speed. If the engine speed is too low, the program again proceeds to the step S33 where the engine is stopped.

If the engine continues to be operated, the program moves the step S34 to determine if the immediately detected cylinder is cylinder number 1. Cylinder number 1 is the cylinder with which the oxygen sensor 55 is associated. If the cylinder number I has not been the one that is detected, the program skips ahead to the point which will be discussed below.

If, however, it is determined at the step S34 that cylinder number 1 is the cylinder that is being immediately sensed, the program then moves to the step S35 to determine if the engine is operating in a cylinder disabling move. If it is not, the program moves to the step S36 so as to clear the register of the disabling information because the engine is now operating under a normal condition.

If, however, at the step S35 it is determined that the system is operating in the disabled cylinder mode so as to reduce or control maximum engine speed, the program moves to the step S37 to determine if the pattern by which the cylinder is disabled should be changed. As has been previously referred to, if the engine is being operated with one or more cylinders disabled so as to limit engine speed for the limp home mode, it is desirable to only disable a given cylinder for a predetermined number of cycles. If the disabling is extended, then on returning to normal operation the spark plug in the disabled cylinder may be fowled and normal operation will not be possible or will be very rough.

Thus, at the step S37 it is determined that the cylinder disabled has been disabled for a time period where it should be returned to operation, the program moves to the step S38. In the step S38, the disabling of the cylinder is switched from one cylinder to another in accordance with a desired pattern.

If it is not time to change the disabled cylinder at the step S37 or if the disabled cylinder number is changed at the step S38, the program then moves to the step S39 so as to set up or update the information as to the cylinder which is being disabled and the ignition disabling for that cylinder. The program then moves to the step S40 so as to actually step up the ignition pulse for the disabled cylinder and ensure that the cylinder will not fire. The program then moves to the step S41 so as to also ensure that the disabled cylinder will not receive fuel from the fuel injection. Then at the step S42, the disabling of injection pulse for the cylinder is also initiated. The program then moves to return.

Figure 8:
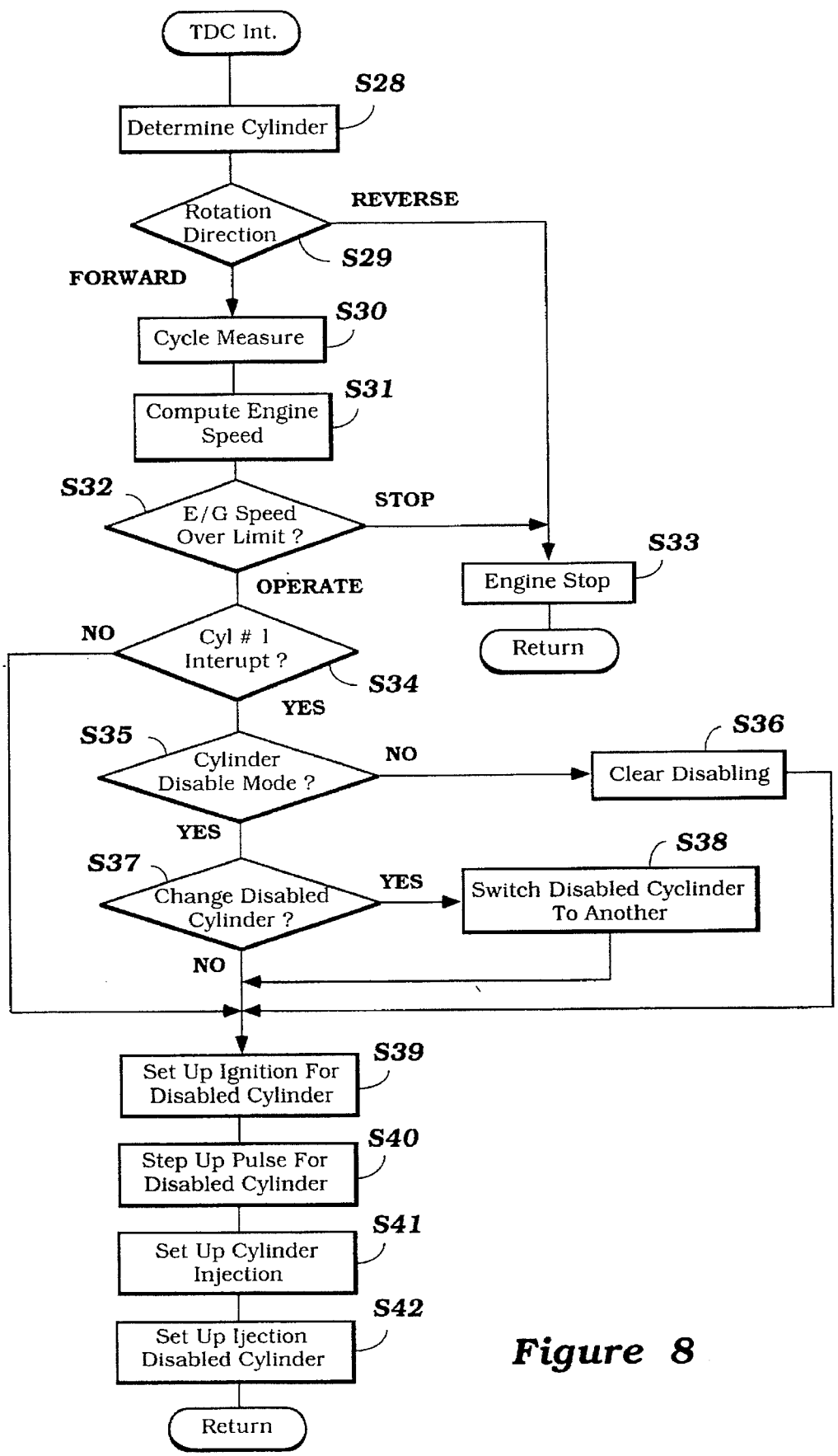
FIG. 8 is a further block diagram showing a further portion of the control routine including the condition when one cylinder is disabled to control the engine speed.
Figure 9:
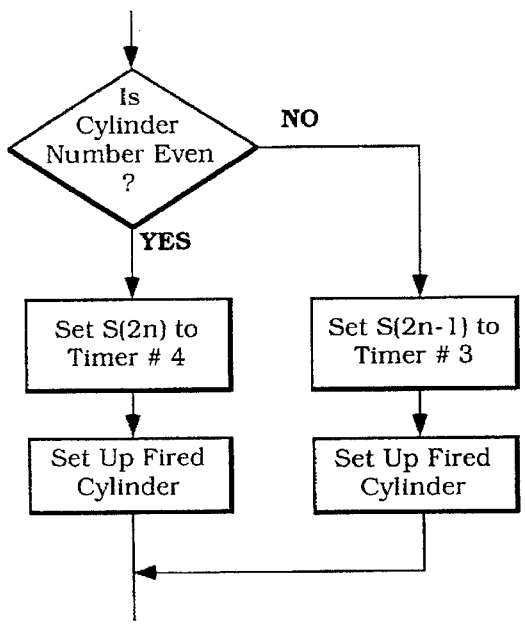
FIG. 9 is a block diagram showing a further portion of the control routine shown in FIG. 8 in sensing the respective cylinders.

FIG. 9 is a detailed subroutine that shows how the ignition pulse for the disabled cylinder at the step S40 in FIG. 8 is determined. In order to minimize the memory requirements and to permit faster computer operation, the system is provided with two timers, one associated with those cylinder numbers that are even, and one that is associated with those cylinder numbers that are odd (Timers #3 and #4). This cylinder number is based upon the firing order. Those skilled in the art will understand the advantages of using the two timers rather than a single timer. In the specific example, the engine is a V-6, as has been noted, and, therefore, the firing of the cylinders is at an equal 60° angle. The cylinders in one bank are even numbered while those in the other bank are odd numbered.

Timer number 3 is utilized for odd-numbered cylinders while timer number 4 is used for even-numbered cylinders. Hence, when the program initially begins to set up the ignition pulse for the cylinder at the step S4, it is determined at the initial step if the cylinder number to be controlled is an even number or an odd number. If it is an odd number, the program moves to the right-hand side so as to set the timer for cylinder number 3 to be equivalent to the determine cylinder times 2 minus 1, that is, S is (2n−1) for the timer. From this, then the timing for the next cylinder number on the odd sequence is set from this information.

On the other hand, if the cylinder number is even, the timer number 4 is utilized and the timing for the next cylinder is set as 2n. The program then moves to the next step so as to set up the appropriate ignition timing for this.

Figure 10:
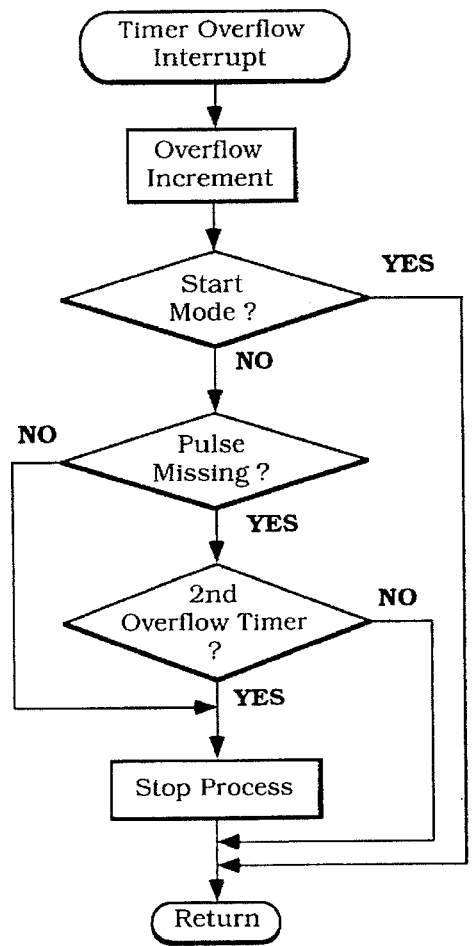
FIG. 10 is a block diagram showing a portion of the control for shut down utilized in FIG. 8.

FIG. 10 shows a control routine that is employed so as to stop the engine if the engine is running too slow. This is an explanation of the control routine which takes place basically in steps S30–S32 of FIG. 8.

If the engine is permitted to run at a speed that is too slow, the plugs will eventually foul and the engine will stall. If the engine is permitted to continue to run until its stalls, then restarting or resumption to normal operation will be difficult. Therefore, when the ECU 52 determines by the control routine of FIG. 10 that the engine is running too slow and fouling will occur to cause stalling, the engine is shut down before that occurs.

There is, therefore, set a timer which counts the time between successive ignition pulses. And thus, at the first step in this figure, the timer overflow interruption is set and in the next step it is determined if the time between successive pulses is excessive because of an overflow of the timer then the program moves to a step to determine if the engine is in the original starting mode.

The reason it is determined if the engine is in original starting mode is that during initial engine starting the speed of the engine will be lower than the normal stalling speed at least initially. Thus, it is desirable not to effect stopping of the engine if the engine is in the original start-up mode because the engine would never be started otherwise. Thus, if it is determined at the start mode step of FIG. 10 that the engine is in the starting mode, the program jumps to the return.

If, however, it is determined that the engine is not in a starting mode, then the program moves to the next step to determine if a pulse has been missed. If a pulse has not been missed, as would be the case if there was a cylinder disabling for reducing the speed, then it is determined that the time interval is too long and the program immediately jumps to the step where the stopping process of the engine is initiated. Engine stopping is accomplished by discontinuing the firing of the ignition for all cylinders and/or the supply of fuel to all cylinders.

If, however, a pulse has been missed it may be because of the fact that the next successive cylinder is one which is not being fired in any event. Then the program moves to another step where the time between pulses is determined to be twice the normal pulse interval so as to accommodate a skipped cylinder. Thus, if the firing between two cylinders exceeds the time interval between 120° plus a time factor at this step, then it is assumed that the engine is running too slow and the program again initiates the stop process so as to stop running the engine and prevent plug fouling.

Figure 11:
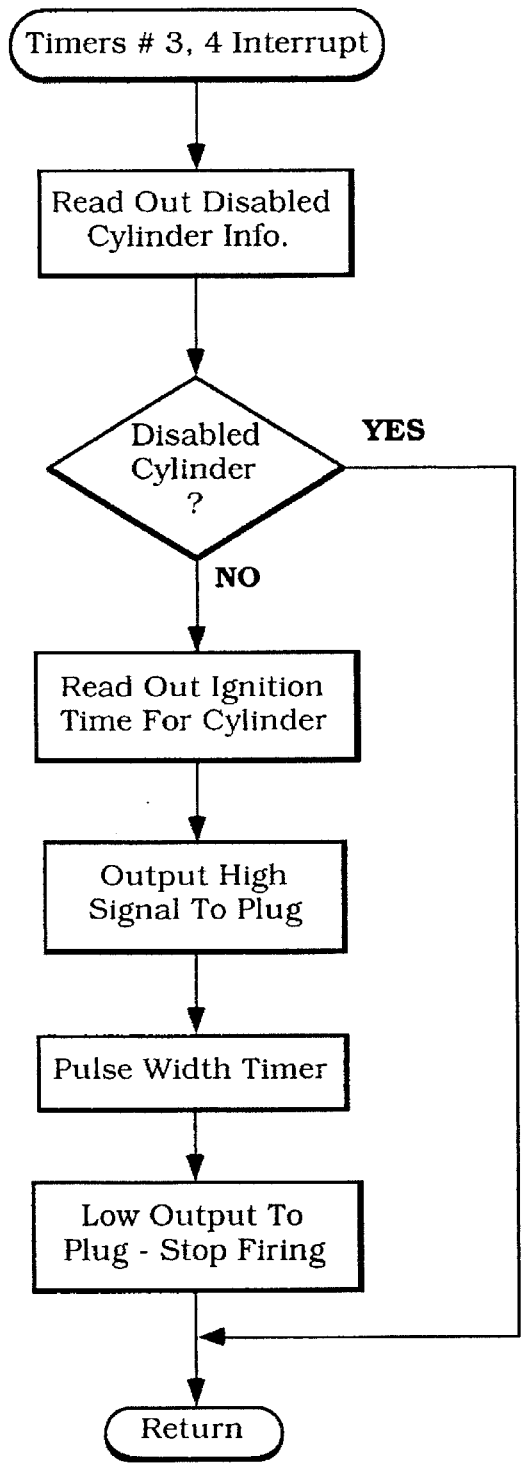
FIG. 11 is a block diagram showing more details of the control routine during cylinder disabling.

FIG. 11 shows the arrangement for controlling the condition when cylinders are disabled. This program starts out by reading the interruption phases from the pulses of the individual cylinders at timers #3 and #4. The program then moves to the next step to read out the disabled cylinder information and identify the cylinder which is being disabled.

The program then moves to the next step to see if the cylinder in question is the cylinder which is being disabled. If so, the program moves to return. If, on the other hand, the cylinder is not a disabled cylinder, then the program moves to the step to read the ignition output for that cylinder and determine the timing interval.

The program then moves to the next step to output a high pulse to the spark coil for that cylinder to effect its sparking.

The program then moves to the next step to set the pulse width timer for the duration of the plug firing, and finally to the step when the ignition output port is returned to the low value and ignition is discontinued.

Having described generally the basic concept by which feedback control is accommodated, the reader should have sufficient background to understand the facets involving the basic control upon which the control routine in accordance with the invention is based. Where any further information is required in connection with the basic feedback control or overall control strategy, reference may be had to the aforenoted co-pending application.

As has been stressed, this invention deals primarily with the manner by which the control operates in the event there is a failure in the output of the throttle position sensor 58. A failure of the throttle position sensor can be determined in one of a wide variety of manners. That is, the position of the throttle valve relative to the operator control can be sensed or, alternatively, changes in the position of the throttle position sensor 58 with time can be monitored and, if no changes occur even though speed changes occur, it can be assumed that the throttle position sensor 58 has failed.

Figure 12:
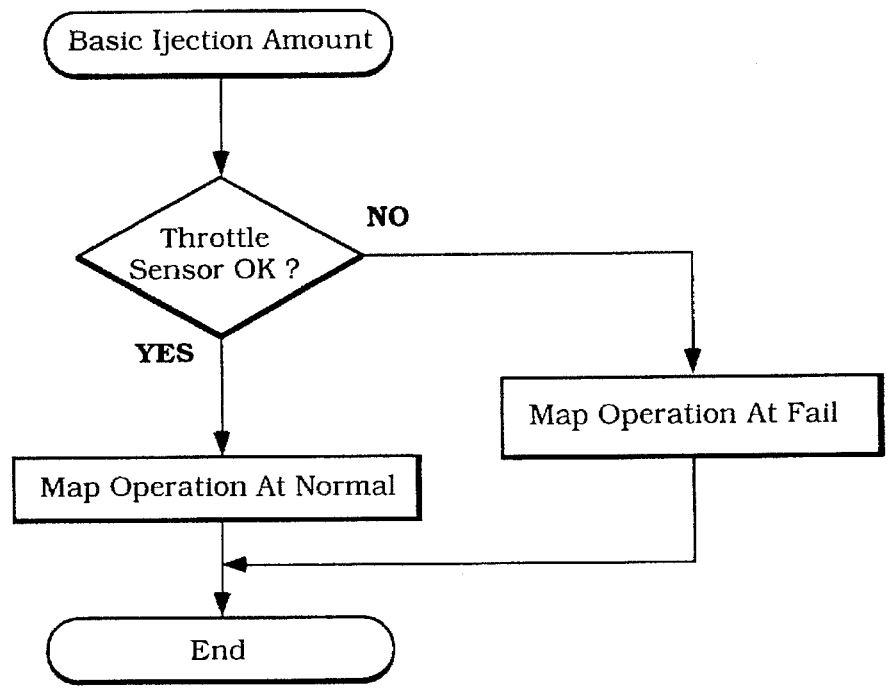
FIG. 12 is a block diagram showing how the basic injection amount is determined depending upon the condition of the throttle position or engine operator demand sensor.

However, the invention does not deal with how the determination of the failure occurs, but rather the control strategy which will be followed when failure does occur. Therefore, and moving first to FIG. 12, the control strategy for determining the basic setting of the map for engine parameters and whether it will be utilized embodying the output of the throttle position sensor 58 or not is illustrated. The program starts and then moves to the first step wherein it is determined if the throttle positioned sensor 58 is outputting an accurate signal. As previously noted, this can be done in any of a variety of manners.

If the throttle position sensor is operative, then the program moves to the normal routine step and ends. This normal routine reads a map as aforenoted in describing the operation of FIG. 4 and the main control routines.

If, however, the throttle position sensor is determined to be inaccurate or unreliable, then the program shifts to a control routine whereby a different type of map is selected for these conditions. This control routine may follow either of the routines shown in FIGS. 13, 14, 15 or 16 and utilizing the maps shown in FIGS. 17, 18 or 19.

Figure 13:
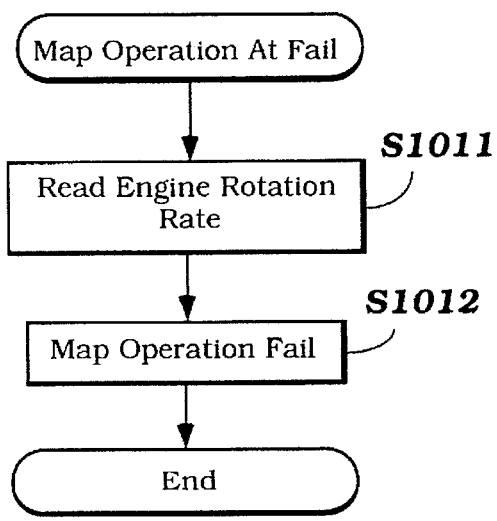
FIG. 13 is a block diagram showing the subroutine of the map operation control at failure of the throttle or operator demand condition sensor.
Figure 17:
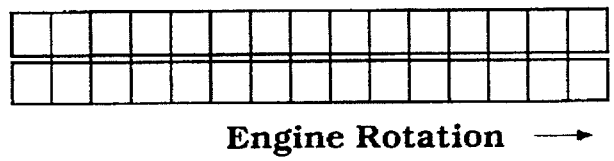
FIG. 17 is map showing the control map utilized in determining the fuel air ratio control at the time of throttle sensor failure in accordance with the embodiment of FIG. 13.

Referring first to FIG. 13 and its corresponding map of FIG. 17, this system provides a map that is indicative only of fuel injection amount based solely upon engine speed. This can be determined experimentally and the map of fuel injection amount for engine speed is shown in FIG. 18.

Thus, the program starts and then moves to the step S1011 so as to read the engine speed. The program then moves to the step S1012 to read the map of FIG. 17 and set the initial injection amount based on this data. The program then continues on through the basic control routines as previously described.

Figure 14:
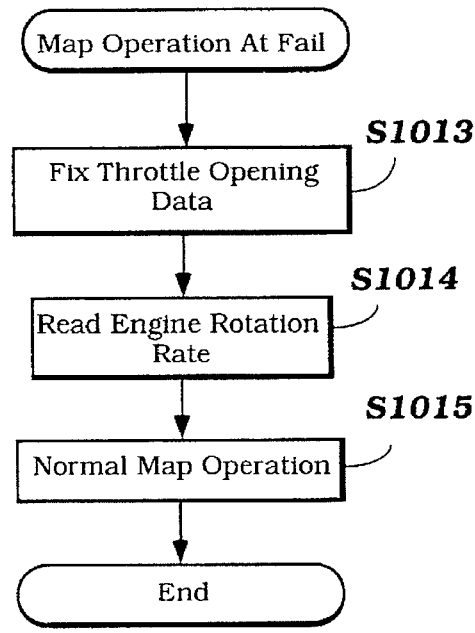
FIG. 14 is a further block diagram showing another embodiment of control routine when the throttle position sensor has failed.
Figure 18:
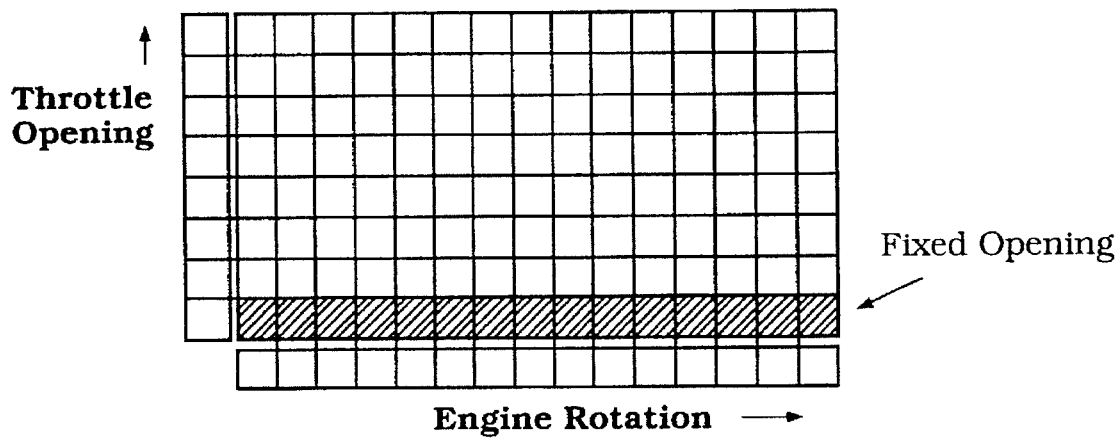
FIG. 18 is a map showing how the basic injection amount is controlled in response to the failure of the sensor in relation to engine speed in accordance with the embodiment of FIG. 14.

FIGS. 14 and 18 show another embodiment and in this embodiment the control routine moves to assume a fixed opening of the throttle valve from the normal control map based upon engine rotational speed and throttle opening as shown in FIG. 18. It may be assumed that, if the throttle sticks, it is going to stick in a closed throttle position and FIG. 18 shows such a fixed position setting. Of course other fixed throttle positions may be assumed.

Therefore, the program operates in accordance with the routine shown in FIG. 14 as will now be described. First, when there is a failure determined, the program moves to the step S1013 to determine a fixed throttle opening setting which will be utilized for the control. The program then moves to the step S1014 so as to read the engine rotational rate. The program then moves to the step S1015 to read from the normal operational map, as shown in FIG. 18, the fuel injection amount based upon the assumed or fixed throttle valve opening. By using the same map as employed for normal running the memory requirements for the ECU 52 can be minimized. This part of the subroutine then ends and the program continues on as previously described.

Figure 15:
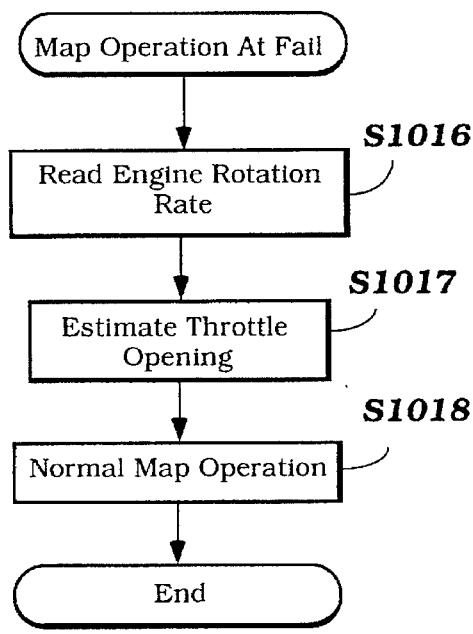
FIG. 15 is yet another block diagram showing yet another embodiment of control in the event of failure in the engine operator demand sensor.
Figure 19:
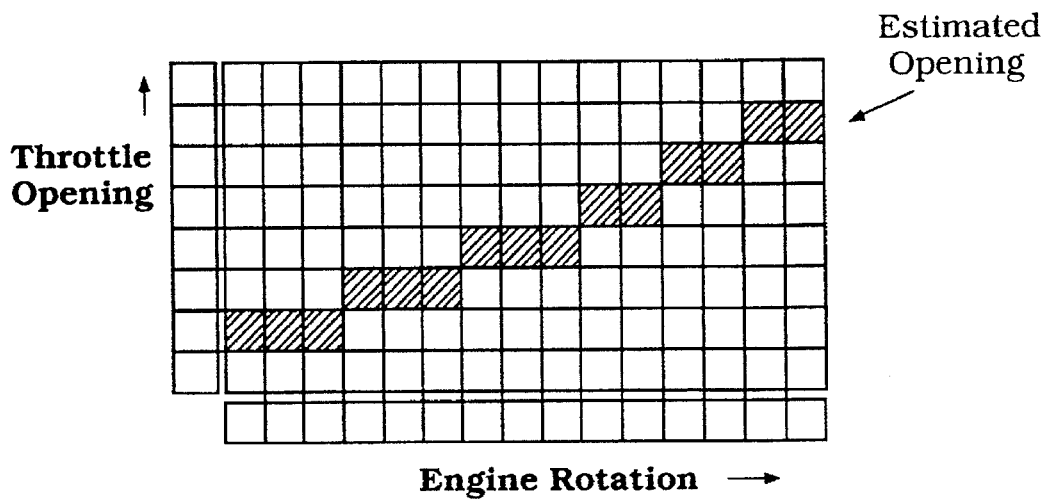
FIG. 19 is a map showing how the estimated throttle opening is determined in the even of failure of the throttle position sensor in accordance with the embodiment of FIG. 15.

Another method is shown in FIGS. 15 and 19, and this assumes an estimate throttle opening from the engine rotational speed. Basically, this assume that the throttle is opened progressively in some relation to engine speed.

This program begins by determining failure and then moves to the step S1016 so as to read the engine speed. From this, an estimated throttle opening is determined as shown on the shaded parts of the map of FIG. 19. Again, the basic map is that utilized for normal engine control.

Then, at the step S1018, the program selects the fuel injection amount from the estimated throttle opening and actual engine measured rotational rate, and proceeds along with the previously noted type of control routines.

Figure 16:
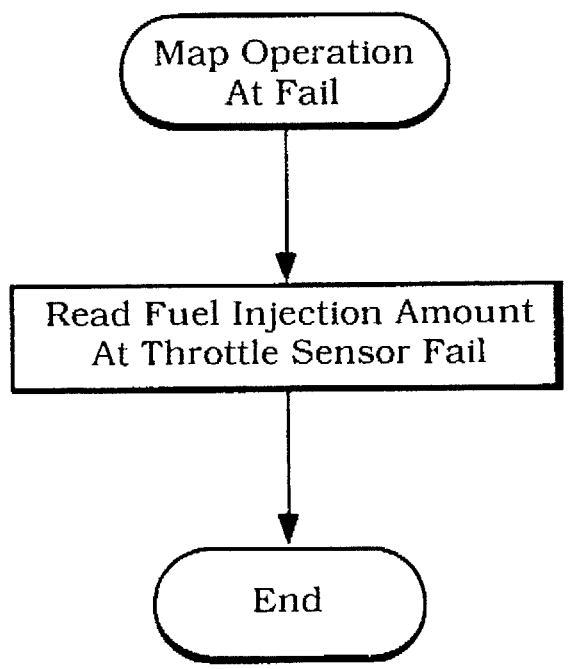
FIG. 16 is yet another block diagram showing another embodiment of control at sensor failure.

Another possible control routine is shown in FIG. 16. This operates so as to read the fuel injection amount at the time of throttle sensor failure and then hold this mount constant.

Therefore, it should be apparent from the foregoing description that the described embodiments are very effective in providing good control even if the throttle position sensor 58 is deemed to have failed. Of course, the foregoing description is that of preferred embodiments of the invention, and various changes and modifications may be made without departing from the spirit and scope of the invention, as defined by the appended claims.

What is claimed is:

1. An engine control system for an internal combustion engine having a combustion chamber, an induction and charge forming system for supplying an air fuel charge to the engine, an exhaust system for discharging a burnt charge from the engine, an air fuel control system including an engine speed sensor for sensing the speed of said engine, and an engine throttle position sensor which senses the condition of the operator demand for engine output, said air fuel control system setting a fuel supply amount from the outputs from the engine speed and operator demand signals indicated by said engine speed sensor and said engine throttle position sensor if the output of said throttle position sensor is deemed to be accurate based upon a map indicative of air fuel ratio in relation to engine operator control position and engine speed and in another way if said throttle position sensor is deemed to be inaccurate.

2. An engine control system as set forth in claim 1, wherein the other way is based upon another map that indicates desired air fuel ratio only from engine speed condition.

3. An engine control system as set forth in claim 2, wherein the map employed in the event of inaccuracy in the output of the throttle position sensor is based upon a map generated by test data determined solely by engine speed.

4. An engine control system as set forth in claim 2, wherein the map employed for control in the event the output of the throttle position sensor is inaccurate is the map employed when the output of the throttle position sensor is deemed to be accurate, but wherein a fixed throttle position setting is assumed.

5. An engine control system as set forth in claim 2, wherein the map employed for control when the throttle position sensor is deemed to be inaccurate is the same map utilized for normal control, but the opening of the throttle position is assumed from the value of the engine speed in accordance with a predetermined relationship.

6. An engine control system as set forth in claim 1, wherein the engine is provided with a fuel injector and the air fuel ratio is set by controlling of the duration of fuel injection.

7. An engine control system as set forth in claim 6, wherein the other way is based upon another map that indicates desired air fuel ratio only from engine speed condition.

8. An engine control system as set forth in claim 7, wherein the map employed in the event of inaccuracy in the output of the throttle position sensor is based upon a map generated by test data determined solely by engine speed.

9. An engine control system as set forth in claim 7, wherein the map employed for control in the event the output of the throttle position sensor is inaccurate is the map employed when the output of the throttle position sensor is deemed to be accurate, but wherein a fixed throttle position setting is assumed.

10. An engine control system as set forth in claim 7, wherein the map employed for control when the throttle position sensor is deemed to be inaccurate is the same map utilized for normal control, but the opening of the throttle position is assumed from the value of the engine speed in accordance with a predetermined relationship.

11. An engine control method for an internal combustion engine having a combustion chamber, an induction and charge forming system for supplying an air fuel charge to the engine, an exhaust system for discharging a burnt charge from the engine, an air fuel control system including an engine speed sensor for sensing the speed of said engine, and an engine throttle position sensor which senses the condition of the operator demand for engine output, said method comprising the steps of setting a fuel supply amount from the outputs from the engine speed and operator demand signals indicated by said engine speed sensor and said engine throttle position sensor if the output of said throttle position sensor is deemed to be accurate based upon a map indicative of air fuel ratio in relation to engine operator control position and engine speed and in another way if said throttle position sensor is deemed to be inaccurate.

12. An engine control method as set forth in claim 11, wherein the other way is based upon another map that indicates desired air fuel ratio only from engine speed condition.

13. An engine control method as set forth in claim 12, wherein the map employed in the event of inaccuracy in the output of the throttle position sensor is based upon a map generated by test data determined solely by engine speed.

14. An engine control method as set forth in claim 13, wherein the map employed for control in the event the output of the throttle position sensor is inaccurate is the map employed when the output of the throttle position sensor is deemed to be accurate, but wherein a fixed throttle position setting is assumed.

15. An engine control method as set forth in claim 13, wherein the map employed for control when the throttle position sensor is deemed to be inaccurate is the same map utilized for normal control, but the opening of the throttle position is assumed from the value of the engine speed in accordance with a predetermined relationship.

16. An engine control method as set forth in claim 11, wherein the engine is provided with a fuel injector and the air fuel ratio is set by controlling of the duration of fuel injection.

17. An engine control method as set forth in claim 16, wherein the other way is based upon another map that indicates desired air fuel ratio only from engine speed condition.

18. An engine control method as set forth in claim 17, wherein the map employed in the event of inaccuracy in the output of the throttle position sensor is based upon a map generated by test data determined solely by engine speed.

19. An engine control method as set forth in claim 17, wherein the map employed for control in the event the output of the throttle position sensor is inaccurate is the map employed when the output of the throttle position sensor is deemed to be accurate, but wherein a fixed throttle position setting is assumed.

20. An engine control method as set forth in claim 17, wherein the map employed for control when the throttle position sensor is deemed to be inaccurate is the same map utilized for normal control, but the opening of the throttle position is assumed from the value of the engine speed in accordance with a predetermined relationship.

* * * * *